(12) United States Patent
Xiong et al.

(10) Patent No.: US 10,045,224 B2
(45) Date of Patent: Aug. 7, 2018

(54) INFORMATION PROCESSING METHOD AND APPARATUS

(71) Applicant: Huawei Technologies Co., Ltd., Shenzhen (CN)

(72) Inventors: Tinggang Xiong, Shanghai (CN); Xiaoze Xu, Shanghai (CN); Xi Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/344,686

(22) Filed: Nov. 7, 2016

(65) Prior Publication Data

US 2017/0055161 A1    Feb. 23, 2017

Related U.S. Application Data

(63) Continuation of application No. PCT/CN2014/076799, filed on May 5, 2014.

(51) Int. Cl.
*H04W 40/00* (2009.01)
*H04W 16/18* (2009.01)
(Continued)

(52) U.S. Cl.
CPC .......... *H04W 16/18* (2013.01); *H04B 17/327* (2015.01); *H04W 16/22* (2013.01)

(58) Field of Classification Search
CPC .... H04B 17/327; H04W 16/18; H04W 16/22; H04W 16/02; H04W 16/24; H04W 24/00;
(Continued)

(56) References Cited

U.S. PATENT DOCUMENTS

| | | | |
|---|---|---|---|
| 2003/0061009 A1* | 3/2003 | Davis | H04W 16/18 702/189 |
| 2003/0186693 A1 | 10/2003 | Shafran et al. | |

(Continued)

FOREIGN PATENT DOCUMENTS

| | | |
|---|---|---|
| CN | 102625326 A | 8/2012 |
| CN | 103108344 A | 5/2013 |

(Continued)

OTHER PUBLICATIONS

"3rd Generation Partnership Project; Technical Specification Group Services and System Aspects; Telecommunication management; Study on NM Centralized Coverage and Capacity Optimization (CCO) SON Function (Release 12)," 3GPP TR 32.836, V0.6.0, Technical Report, Jun. 2013, 24 pages.

(Continued)

*Primary Examiner* — Kathy Wang-Hurst
*Assistant Examiner* — B. M. M Hannan
(74) *Attorney, Agent, or Firm* — Conley Rose, P.C.

(57) ABSTRACT

An information processing method and apparatus relate to the field of mobile communications technologies, which are used to resolve a technical problem that no better network planning method is available. A user target throughput (UTT) for a user terminal and a grid throughput ability (GTA) of a grid in which the user terminal is located are determined such that whether a GAP area exists in the grid is determined. This determining manner not only considers user experience, but also makes reference to real service features of a network. Conducting network planning in this manner can make network planning more appropriate and make user experience better.

14 Claims, 4 Drawing Sheets

---

Determine a UTT for a user terminal, and determine a GTA of a grid in which the user terminal is located — 101

Determine, according to at least the UTT and the GTA, whether a GAP area exists in the grid — 102

(51) Int. Cl.
*H04B 17/327* (2015.01)
*H04W 16/22* (2009.01)

(58) Field of Classification Search
CPC ..... H04W 24/02; H04W 16/00; H04W 16/14; H04W 60/04; H04W 88/06; G06F 2209/501; G06F 9/5011; G06F 9/5072; G06F 9/50; H04L 2029/06054; H04L 67/1002; H04L 67/1012; H04L 67/322; H04L 12/28; H04L 29/06; H04L 29/06027; H04L 67/16; H04L 67/38; G06Q 10/06375; G06Q 10/1093
USPC .................. 455/446; 709/202, 226; 718/104
See application file for complete search history.

(56) References Cited

U.S. PATENT DOCUMENTS

| | | | |
|---|---|---|---|
| 2005/0135313 | A1 | 6/2005 | Gandhi et al. |
| 2006/0047802 | A1* | 3/2006 | Iszlai ............... G06Q 10/06375 709/224 |
| 2006/0067275 | A1* | 3/2006 | Yang ..................... H04W 16/18 370/332 |
| 2006/0094439 | A1 | 5/2006 | Christian |
| 2008/0147846 | A1* | 6/2008 | Behroozi ................ H04L 43/50 709/224 |
| 2008/0207221 | A1* | 8/2008 | Chari .................... H04W 48/18 455/456.1 |
| 2009/0003236 | A1 | 1/2009 | Aoyama et al. |
| 2009/0216883 | A1* | 8/2009 | Fellenstein ........... G06F 9/5011 709/224 |
| 2010/0091746 | A1 | 4/2010 | Li |
| 2014/0073317 | A1 | 3/2014 | Zhou et al. |
| 2014/0141788 | A1* | 5/2014 | Puthenpura ........... H04W 16/18 455/449 |

FOREIGN PATENT DOCUMENTS

| | | |
|---|---|---|
| CN | 103200580 A | 7/2013 |
| JP | H11163784 A | 6/1999 |
| JP | 2013042202 A | 2/2013 |
| JP | 2015534357 A | 11/2015 |
| WO | 2014043582 A2 | 3/2014 |

OTHER PUBLICATIONS

Foreign Communication From a Counterpart Application, European Application No. 14891170.4, Extended European Search Report dated Apr. 12, 2017, 10 pages.
Foreign Communication From a Counterpart Application, Korean Application No. 10-2016-7033578, Korean Office Action dated Apr. 13, 2017, 4 pages.
Foreign Communication From a Counterpart Application, Korean Application No. 10-2016-7033578, English Translation of Korean Office Action dated Apr. 27, 2017, 6 pages.
Foreign Communication From a Counterpart Application, PCT Application No. PCT/CN2014/076799, English Translation of International Search Report dated Feb. 9, 2015, 2 pages.
Foreign Communication From a Counterpart Application, PCT Application No. PCT/CN2014/076799, English Translation of Written Opinion dated Feb. 9, 2015, 5 pages.
Machine Translation and Abstract of Japanese Publication No. JP2013042202, Feb. 28, 2013, 28 pages.
Machine Translation and Abstract of Japanese Publication No. JPH11163784, Jun. 18, 1999, 7 pages.
Foreign Communication From a Counterpart Application, Japanese Application No. 2016-566743, Japanese Office Action dated Jan. 11, 2018, 3 pages.
Foreign Communication From a Counterpart Application, Japanese Application No. 2016-566743, English Translation of Japanese Office Action dated Jan. 11, 2018, 4 pages.

* cited by examiner

INFORMATION PROCESSING METHOD AND APPARATUS

CROSS-REFERENCE TO RELATED APPLICATIONS

This application is a continuation of International Application No. PCT/CN2014/076799, filed on May 5, 2014, the disclosure of which is hereby incorporated by reference in its entirety.

TECHNICAL FIELD

The present disclosure relates to the field of mobile communications technologies, and in particular, to an information processing method and apparatus.

BACKGROUND

With development of mobile communications technologies, a focus of mobile services has changed from voice services to data services. A call drop rate and a handover success rate that were concerned about in the past are no longer key indicators of user experience to a large extent. Even if a data service drops in a transmission process, the data service can be reestablished automatically without being perceived by a user. For data services, users are more concerned about whether they can browse web pages and watch videos and so on smoothly enough using user terminals. Therefore, how to conduct network planning to meet data transmission requirements of users becomes particularly important.

In other approaches, for network planning, generally, a manner of planning based on an edge throughput target is used. The manner includes selecting an appropriate propagation model, considering mobility, distribution behaviors, and traffic models of users, and performing estimation and simulation around the edge throughput target, to obtain the number of new sites and the number of cells that are needed in a target network.

However, this planning solution basically considers only situations of users. In early development of a network, because effective requirements of users are not great, this solution can be used to meet basic service requirements. However, as the network is developing toward maturity gradually, and in particular, as intelligent terminals become popular, and Internet companies directly provide abundant video and data services based on the open Internet for users bypassing operators, a method in which network planning can be conducted depending on real service features of a network is needed in order to obtain a more appropriate planning result.

SUMMARY

Embodiments of the present disclosure provide an information processing method and apparatus such that an appropriate network planning result can be obtained.

According to a first aspect of the present disclosure, an information processing apparatus is provided and includes a first determining module configured to determine a user target throughput (UTT) for a user terminal, and determine a grid throughput ability (GTA) of a grid in which the user terminal is located, and a second determining module configured to determine, according to at least the UTT and the GTA, whether a gap (GAP) area exists in the grid.

With reference to the first aspect, in a first possible implementation manner, the first determining module is configured to determine a UTT for a user terminal includes determining the UTT for the user terminal according to a service experience level and a network service model.

With reference to the first possible implementation manner of the first aspect, in a second possible implementation manner, that the first determining module configured to determine the UTT for the user terminal according to a service experience level and a network service model includes separately determining single service experience throughputs of N services according to the service experience level and the network service model, where N is the total number of services corresponding to the user terminal, and determining the UTT according to the single service experience throughputs of the N services and the network service model.

With reference to the second possible implementation manner of the first aspect, in a third possible implementation manner, the network service model includes at least the number of concurrent services of a single user, and that the first determining module is further configured to determine the UTT according to the single service experience throughputs of the N services and the network service model includes setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining single service integrated throughputs of the N services in total, and obtaining a total service integrated throughput in the grid according to the single service integrated throughputs of the N services, and obtaining the UTT of the user terminal according to the total service integrated throughput in the grid and the number of concurrent services of the user terminal.

With reference to the first aspect or any possible implementation manner of the first possible implementation manner to the third possible implementation manner of the first aspect, in a fourth possible implementation manner, that the first determining module is configured to determine a GTA of a grid in which the user terminal is located includes determining the GTA according to a network-scheduled throughput obtained in the grid by the user terminal.

With reference to the first aspect or any possible implementation manner of the first possible implementation manner to the fourth possible implementation manner of the first aspect, in a fifth possible implementation manner, the second determining module is further configured to determine a user real throughput (URT) of the user terminal and a single service real throughput (SRT) of the user terminal that are in the grid, and determine, according to the UTT, the GTA, the URT, and the SRT, whether a GAP area exists in the grid.

With reference to the first aspect or any possible implementation manner of the first possible implementation manner to the fifth possible implementation manner of the first aspect, in a sixth possible implementation manner, the apparatus further includes a processing module configured to determine a type corresponding to the grid, and determine, according to the type corresponding to the grid, a method for enhancing the GTA of the grid, to reduce the GAP area when a GAP area exists in the grid.

With reference to the sixth possible implementation manner of the first aspect, in a seventh possible implementation manner, that the processing module is configured to determine a type corresponding to the grid includes determining that the grid is of a coverage-restricted type, and the processing module is further configured to send an indication signal to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

With reference to the seventh possible implementation manner of the first aspect, in an eighth possible implementation manner, the processing module is further configured to determine that the grid is of a coverage-restricted type and determining whether received signal code power (RSCP) of the grid is lower than a first preset RSCP threshold, and determining that the type corresponding to the grid is the coverage-restricted type if the RSCP of the grid is lower than the first preset RSCP threshold.

With reference to the sixth possible implementation manner of the first aspect, in a ninth possible implementation manner, the processing module is configured to determine a type corresponding to the grid and includes determining that the grid is of a capacity-restricted type, and the processing module is further configured to determine to enhance the GTA of the grid in a carrier expansion manner when determining that a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

With reference to the ninth possible implementation manner of the first aspect, in a tenth possible implementation manner, the processing module is further configured to determine that the grid is of a capacity-restricted type and determining whether RSCP of the grid is higher than a second preset RSCP threshold, and determining whether a current received pilot signal level (EcIo) of the grid is higher than a preset EcIo threshold, and determining that the type corresponding to the grid is the capacity-restricted type if the RSCP of the grid is higher than the preset RSCP threshold, and the EcIo of the grid is higher than the preset EcIo threshold.

With reference to the ninth possible implementation manner or the tenth possible implementation manner of the first aspect, in an eleventh possible implementation manner, that the processing module is further configured to determine to enhance the GTA of the grid in a carrier expansion manner and includes increasing the number of carriers in the primary serving cell of the grid.

With reference to the eleventh possible implementation manner of the first aspect, in a twelfth possible implementation manner, the processing module is further configured to determine whether the number of grids meeting a preset condition and in which GAP areas exist reaches a preset number, and determine whether the number of grids meeting the preset condition is increased after carriers are added, where the preset condition is that a GTA of a grid in which a GAP area exists reaches a UTT, and determine that the added carriers are effective when the number of grids meeting the preset condition and in which GAP areas exist reaches the preset number, and that the number of grids meeting the preset condition is increased.

According to a second aspect of the present disclosure, an information processing apparatus is provided and includes a memory configured to store an instruction, and a processor configured to execute the instruction, determine a UTT for a user terminal, and determine a GTA of a grid in which the user terminal is located, and determine, according to at least the UTT and the GTA, whether a GAP area exists in the grid.

With reference to the second aspect, in a first possible implementation manner, that the processor is configured to execute the instruction, and determine a UTT for a user terminal includes executing the instruction, and determining the UTT for the user terminal according to a service experience level and a network service model.

With reference to the first possible implementation manner of the second aspect, in a second possible implementation manner, that the processor is further configured to execute the instruction, and determine the UTT for the user terminal according to a service experience level and a network service model includes executing the instruction, and separately determining single service experience throughputs of N services according to the service experience level and the network service model, where N is the total number of services corresponding to the user terminal, and determining the UTT according to the single service experience throughputs of the N services and the network service model.

With reference to the second possible implementation manner of the second aspect, in a third possible implementation manner, the network service model includes at least the number of concurrent services of a single user, and that the processor is further configured to determine the UTT according to the single service experience throughputs of the N services and the network service model includes executing the instruction, setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining a total service integrated throughput in the grid according to single service integrated throughputs of the N services, and obtaining the UTT of the user terminal according to the total service integrated throughput in the grid and the number of concurrent services of the user terminal.

With reference to the second aspect or any possible implementation manner of the first possible implementation manner of the second aspect to the third possible implementation manner of the second aspect, in a fourth possible implementation manner, that the processor is configured to determine a GTA of a grid in which the user terminal is located includes executing the instruction, and determining the GTA according to a network-scheduled throughput obtained in the grid by the user terminal.

With reference to the second aspect or any possible implementation manner of the first possible implementation manner of the second aspect to the fourth possible implementation manner of the second aspect, in a fifth possible implementation manner, that the processor is configured to determine, according to at least the UTT and the GTA, whether a GAP area exists in the grid includes executing the instruction, determining a URT of the user terminal and a single SRT of the user terminal that are in the grid, and determining, according to the UTT, the GTA, the URT, and the SRT, whether a GAP area exists in the grid.

With reference to the second aspect or any possible implementation manner of the first possible implementation manner of the second aspect to the fifth possible implementation manner of the second aspect, in a sixth possible implementation manner, the processor is further configured to execute the instruction, and determine a type corresponding to the grid, and determine, according to the type corresponding to the grid, a method for enhancing the GTA of the grid, to reduce the GAP area when a GAP area exists in the grid.

With reference to the sixth possible implementation manner of the second aspect, in a seventh possible implementation manner, the processor is configured to execute the instruction, determine a type corresponding to the grid, and determine that the grid is of a coverage-restricted type, and the processor is further configured to execute the instruction, and send an indication signal to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

With reference to the seventh possible implementation manner of the second aspect, in an eighth possible implementation manner, that the processor is further configured to execute the instruction, determine that the grid is of a coverage-restricted type, and determine whether RSCP of the grid is lower than a first preset RSCP threshold, and determine that the type corresponding to the grid is the coverage-restricted type if the RSCP of the grid is lower than the first preset RSCP threshold.

With reference to the sixth possible implementation manner of the second aspect, in a ninth possible implementation manner, that the processor is configured to execute the instruction, and determine a type corresponding to the grid is of a capacity-restricted type, and the processor is further configured to execute the instruction, and determine to enhance the GTA of the grid in a carrier expansion manner when a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

With reference to the ninth possible implementation manner of the second aspect, in a tenth possible implementation manner, the processor is further configured to execute the instruction, determine that the grid is of a capacity-restricted type, determine whether RSCP of the grid is higher than a second preset RSCP threshold, and determining whether a EcIo of the grid is higher than a preset EcIo threshold, and determine that the type corresponding to the grid is the capacity-restricted type if the RSCP of the grid is higher than the preset RSCP threshold, and the EcIo of the grid is higher than the preset EcIo threshold.

With reference to the ninth possible implementation manner of the second aspect or the tenth possible implementation manner of the second aspect, in an eleventh possible implementation manner, the processor is further configured to determine to enhance the GTA of the grid in a carrier expansion manner further includes increasing the number of carriers in the primary serving cell of the grid.

With reference to the eleventh possible implementation manner of the second aspect, in a twelfth possible implementation manner, the processor is further configured to execute the instruction, determine whether the number of grids meeting a preset condition and in which GAP areas exist reaches a preset number, and determine whether the number of grids meeting the preset condition is increased after carriers are added, where the preset condition is that a GTA of a grid in which a GAP area exists reaches a UTT, and determine that the added carriers are effective when the number of grids meeting the preset condition and in which GAP areas exist reaches the preset number, and that the number of grids meeting the preset condition is increased.

According to a third aspect of the present disclosure, an information processing method is provided and includes determining a UTT for a user terminal, determining a GTA of a grid in which the user terminal is located, and determining, according to at least the UTT and the GTA, whether a GAP area exists in the grid.

With reference to the third aspect, in a first possible implementation manner, determining a UTT for a user terminal includes determining the UTT for the user terminal according to a service experience level and a network service model.

With reference to the first possible implementation manner of the third aspect, in a second possible implementation manner, determining the UTT for the user terminal according to a service experience level and a network service model includes separately determining single service experience throughputs of N services according to the service experience level and the network service model, where N is the total number of services corresponding to the user terminal, and determining the UTT according to the single service experience throughputs of the N services and the network service model.

With reference to the second possible implementation manner of the third aspect, in a third possible implementation manner, the network service model includes at least the number of concurrent services of a single user, and determining the UTT according to the single service experience throughputs of the N services and the network service model includes setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining single service integrated throughputs of the N services in total, and obtaining a total service integrated throughput in the grid according to the single service integrated throughputs of the N services, and obtaining the UTT of the user terminal according to the total service integrated throughput in the grid and the number of concurrent services of the user terminal.

With reference to the third aspect or any possible implementation manner of the first possible implementation manner to the third possible implementation manner of the third aspect, in a fourth possible implementation manner, determining a GTA of a grid in which the user terminal is located includes determining the GTA according to a network-scheduled throughput obtained in the grid by the user terminal.

With reference to the third aspect or any possible implementation manner of the first possible implementation manner to the fourth possible implementation manner of the third aspect, in a fifth possible implementation manner, determining, according to at least the UTT and the GTA, whether a GAP area exists in the grid includes determining a URT of the user terminal and a single SRT of the user terminal that are in the grid, and determining, according to the UTT, the GTA, the URT, and the SRT, whether a GAP area exists in the grid.

With reference to the third aspect or any possible implementation manner of the first possible implementation manner to the fifth possible implementation manner of the third aspect, in a sixth possible implementation manner, the method further includes determining a type corresponding to the grid, and determining, according to the type corresponding to the grid, a method for enhancing the GTA of the grid, to reduce the GAP area when a GAP area exists in the grid.

With reference to the sixth possible implementation manner of the third aspect, in a seventh possible implementation manner, determining a type corresponding to the grid includes determining that the grid is of a coverage-restricted type, and sending an indication signal to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

With reference to the seventh possible implementation manner of the third aspect, in an eighth possible implementation manner, determining that the grid is of a coverage-restricted type includes determining whether RSCP of the grid is lower than a first preset RSCP threshold, and determining that the type corresponding to the grid is the coverage-restricted type if the RSCP of the grid is lower than the first preset RSCP threshold.

With reference to the sixth possible implementation manner of the third aspect, in a ninth possible implementation manner, determining a type corresponding to the grid includes determining that the grid is of a capacity-restricted type, and determining to enhance the GTA of the grid in a carrier expansion manner when a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

With reference to the ninth possible implementation manner of the third aspect, in a tenth possible implementation manner, determining that the grid is of a capacity-restricted type includes determining whether RSCP of the grid is higher than a second preset RSCP threshold, and determining whether a EcIo of the grid is higher than a preset EcIo threshold, and determining that the type corresponding to the grid is the capacity-restricted type if the RSCP of the grid is higher than the preset RSCP threshold, and the EcIo of the grid is higher than the preset EcIo threshold.

With reference to the ninth possible implementation manner of the third aspect or the tenth possible implementation manner of the third aspect, in an eleventh possible implementation manner, enhancing the GTA of the grid in a carrier expansion manner includes increasing the number of carriers in the primary serving cell of the grid.

With reference to the eleventh possible implementation manner of the third aspect, in a twelfth possible implementation manner, after increasing the number of carriers in the primary serving cell of the grid, the method further includes determining whether the number of grids meeting a preset condition and in which GAP areas exist reaches a preset number, and determining whether the number of grids meeting the preset condition is increased after carriers are added, where the preset condition is that a GTA of a grid in which a GAP area exists reaches a UTT, and determining that the added carriers are effective when the number of grids meeting the preset condition and in which GAP areas exist reaches the preset number, and that the number of grids meeting the preset condition is increased.

In the technical solutions provided by the embodiments of the present disclosure, a target network is planned comprehensively according to a user target throughput of a user terminal and a grid throughput ability of a grid, user experience is quantized into a target bandwidth throughput, and network planning is conducted depending on bandwidth requirements of different services in the network. Conducting network planning depending on real service features of a network can achieve a more appropriate network planning result and improve user experience while fully considering experience of a terminal user.

DESCRIPTION OF EMBODIMENTS

Figure 1:
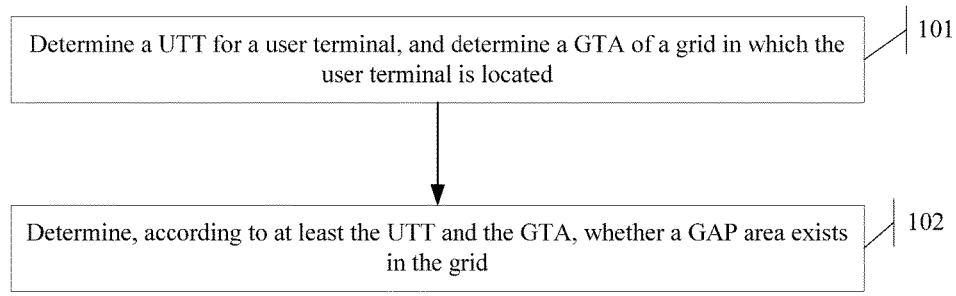
FIG. 1 is a main flowchart of an information processing method according to an embodiment of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Technologies described in this specification may be applied to various communications systems, for example, current second generation (2G) and third generation (3G) communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

In addition, the terms "system" and "network" may be used interchangeably in this specification. The term "and/or" in this specification describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

The technical solutions of the embodiments of the present disclosure relate to a base station, which may be, for example, a base transceiver station (BTS) in GSM or CDMA, or may be a NodeB in WCDMA, or may be an evolved NodeB (e-NodeB) in LTE, and is not particularly limited in the embodiments of the present disclosure.

The technical solutions of the embodiments of the present disclosure are mainly implemented using a grid as an object. The surface of the earth may be divided into grid arrays that are of an equal size and immediately adjacent to each other when network planning is conducted. Each grid may be called a grid, and each grid may uniquely represent a specific geographic location area. According to sizes of division scales, there are multiple grids such as 10 meters (m)*10 m, 20 m*20 m, and 50 m*50 m. There are multiple division methods, all of which are existing methods in the prior art and are not repeated.

A grid may be covered by multiple cells. In multiple cells covering a grid, a cell is a primary cell of the grid, namely, a primary serving cell of the grid. For a grid, a GAP area may exist, and a terminal located in the GAP area is hardly covered by a signal of any cell covering the grid. Therefore, what the embodiments of the present disclosure need to resolve is how to properly determine whether a GAP area exists in a grid, and further, how to process the grid to reduce and eliminate the GAP area as much as possible to improve signal coverage if a GAP area exists in the grid.

In the embodiments of the present disclosure, a real throughput of a user terminal refers to a real throughput when the user terminal actually carries out a service. The real throughput may be classified into a URT and an SRT according to a statistical hierarchy, where the URT is a user-level real throughput, and the SRT is a service-level real throughput.

In the embodiments of the present disclosure, a GTA may be a throughput that can be reached when the user terminal is located in different grids, and is obtained through calculation according to radio channel quality of a network, power consumption, and user terminal distribution, namely, a bandwidth throughput that the live network can provide to a single user.

In the embodiments of the present disclosure, a base station may obtain, using a certain positioning technology such as a global positioning system (GPS), a geographic location in which the user terminal is located when the user terminal reports a measurement report (MR), and normalizes the geographic location into a grid, where a location of the grid is an MR positioning result.

Referring to FIG. 1, an embodiment of the present disclosure provides an information processing method, where the method may be executed by a base station. A main procedure of the method is described as follows.

Step 101: Determine a UTT for a user terminal, and determine a GTA of a grid in which the user terminal is located.

Optionally, in this embodiment of the present disclosure, determining a UTT for a user terminal may include determining the UTT for the user terminal according to a service experience level and a network service model.

When the user terminal uses a specific service, corresponding to different subjective user experience, user experience levels may be classified. For example, the user experience levels may be classified into three levels, Excellent, Good, and Bad. A user experience level may also be called a service experience level, which indicates service running quality when the user terminal uses a certain service. Corresponding to each service type, each service experience level has a corresponding service experience benchmark, including specific evaluation indicators, for example, response, display delay, page display success rate, and buffer duration. A service experience level of a specific service type may be determined according to evaluation indicators corresponding to the service. For details, reference may be made to examples described in Table 1.

TABLE 1

| Service type | Service experience benchmark | Subjective user experience | Service experience level |
|---|---|---|---|
| Web (web page) | Home page response delay: <1 second (s)<br>Home page display delay: <4 s<br>Page display success rate: >96% | Web browsing is very smooth | Excellent |
| | Home page response delay: 1-1.5 s<br>Home page display delay: 4-10 s<br>Page display success rate: 90%-96% | Smooth or wait for a moment | Good |
| | Home page response delay: >1.5 s<br>Home page display delay: >10 s<br>Page display success rate: <90% | Have an obvious sense of waiting, which may cause a user to be inpatient or abandon | Bad |
| Streaming (360 | Initial buffer duration: <7 s<br>Single maximum buffer duration: <3 s | Fast start, play smoothly | Excellent |

TABLE 1-continued

| Service type | Service experience benchmark | Subjective user experience | Service experience level |
|---|---|---|---|
| progressive scan (P)) (data stream) | Number of re-buffer times: <=1 time/hour<br>Re-buffer duration: <3 s/hour<br>Initial buffer duration: 7-9 s<br>Single maximum buffer duration: <6 s<br>Number of re-buffer times: <=2 times/hour<br>Re-buffer duration: <8 s/hour | Normally play, basically smooth | Good |
| | Initial buffer duration: >9 s<br>Single maximum buffer duration: >6 s<br>Number of re-buffer times: >2 times/hour<br>Re-buffer duration: >8 s/hour | Initial waiting time of video playing is long, there are many play interruptions, experience is worse than user experience | Bad |

In this embodiment of the present disclosure, the network service model refers to descriptions about a network service, where the descriptions are made using multiple parameters, and the parameters may include service type (ServiceType), service traffic (ServiceTraffic), real transmission time (RealTransTime), and the number of concurrent services of a single user (CoServiceNum).

ServiceType may include multiple services such as Web, Streaming, File Transfer Protocol (FTP), Email, Voice over Internet Protocol (VoIP), and gaming. VoIP refers to real-time transfer of a digitized analog signal in a form of an encapsulated data packet on an Internet Protocol (IP) network. ServiceTraffic is traffic of various services in the network such as the foregoing services. After traffic of various services performed by a same user terminal is summated, service traffic of a single user (UserTraffic) is obtained. After traffic of a same service is summated, single service traffic (SingleServiceTraffic) is obtained. The real transmission time indicates the time spent in transmitting single service traffic of each service actually in the network. After the real transmission time of a same user terminal is summated, the real transmission time of a single user (UserRealTransTime) is obtained. After the real transmission time of a same service is summated, the real transmission time of a single service (ServiceRealTransTime) is obtained. CoServiceNum indicates the number of services that a single user terminal carries out simultaneously and averagely, and may be referred to as the number of concurrent services of a single user.

Optionally, the network service model may be identified by means of data packet capture on a user plane in the network. A capture manner may be implemented, for example, using an external probe, that is, deploying a data analyzer on an interface between network elements to capture a packet for analysis, or using a built-in probe, that is, implementing a function of a data analyzer in a network element.

In this embodiment of the present disclosure, a UTT of a user terminal may refer to a bandwidth requirement required by user experience to reach a Good or Excellent service experience level, where the bandwidth requirement is a bandwidth throughput of a single user in target network planning. According to the service experience level and the network service model, the service experience level of the user terminal may be quantized into the foregoing bandwidth requirement, that is, the UTT of the user terminal is acquired. By matching with an MR positioning result, a finest granularity of the UTT on a grid level may be identified.

Further, first, single service experience throughputs of N services are separately determined according to the service experience level and the network service model, and then the UTT is determined according to the single service experience throughput of each service in the N services and the network service model. N is the total number of services corresponding to the user terminal, that is, the number of concurrent services of the user terminal.

Optionally, in this embodiment of the present disclosure, that the UTT is determined according to the single service experience throughput of each service and the network service model may include setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining single service integrated throughputs of the N services in total, and obtaining a total service integrated throughput in the grid according to the single service integrated throughputs of the N services, and obtaining the UTT of the user terminal according to the total service integrated throughput in the grid and the number of concurrent services of the user terminal.

Figure 2:
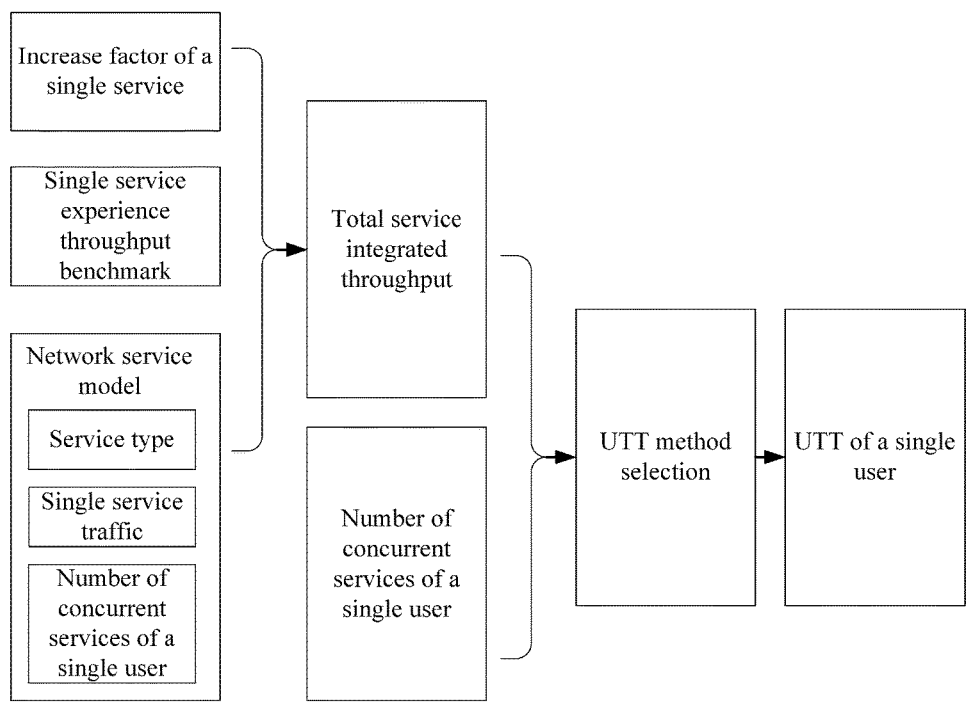
FIG. 2 is a flowchart of a method for calculating a UTT according to an embodiment of the present disclosure.

Referring to FIG. 2, the process of calculating the UTT is described in detail.

Step 1: Perform mapping according to the network service model and the service experience level to obtain a single service experience throughput benchmark (ServiceThroughputBenchmark).

Because service experience levels of the user terminal include three levels, Excellent, Good, and Bad, through analysis of the network service model, the service experience level may be quantized into a bandwidth requirement, where the bandwidth requirement is the single service experience throughput benchmark.

Web and Streaming services are used as an example to describe a method for calculating the single service experience throughput benchmark.

Single service experience throughput benchmark (web)= Web page size/Corresponding experience time For example, for a web service, for the Excellent service experience level, a corresponding experience time is 3 s, and correspondingly, for the Good service experience level, a corresponding experience time is 5 s.

Single service experience throughput benchmark (Streaming)=Streaming service bit rate*K K is a coefficient. For the Streaming service, for the Excellent service experience level, K is set to 1.3, and for the Good service experience level, K is set to 1.1.

According to a survey on a large number of global Universal Mobile Telecommunications System (UMTS) network services, a typical single service experience throughput benchmark is shown in Table 2.

TABLE 2

| Service type | Single service experience throughput benchmark (kilobits per second (kbps)) | |
| --- | --- | --- |
| | Excellent | Good |
| WEB | 512 | 256 |
| Streaming(240P) | 300 | 256 |
| Streaming(360P) | 900 | 768 |
| Streaming(480P) | 2000 | 1650 |
| Streaming(720P) | 4096 | 2500 |
| VoIP(Voice) | 128 | 64 |
| VoIP(Video) (network video) | 300 | 256 |
| social networking service(SNS) | 512 | 256 |
| Email | 600 | 400 |
| File Transfer | 1000 | 512 |
| Instant Messaging (IM) | 64 | 32 |
| Cloud | 800 | 400 |
| Gaming | 512 | 256 |

Step 2: Calculate the UTT according to the network service model and the single service experience throughput benchmark. A specific calculation step is as follows.

a. Single target data transmission time of a service of service type i (ServiceTranTime) =Service traffic of service i/Single service experience throughput benchmark of service i.

A physical meaning of the single target data transmission time of service i is a minimum transmission time required for transmitting traffic corresponding to service i and guaranteeing the Good or Excellent service experience level.

b. Single target data transmission weight of service i (ServiceTranTimeRatio)=Single target data transmission time of service i/SUM (Single target data transmission time of service i), where SUM indicates summating the target data transmission time of all services.

That is, a single service integrated throughput of each service in the grid is calculated according to the single target data transmission weight of each service and the single service experience throughput of the service.

A physical meaning of the single target data transmission weight of service i is a probability that data transmission of service i is performed on a same time slice.

c. Total service integrated throughput in the grid (IntThroughput)=SUM (Single target data transmission weight of service i*Single service experience throughput benchmark of service i).

Single target data transmission weight of service i*Single service experience throughput benchmark of service i is the single service experience throughput of service i.

That is, the total service integrated throughput in the grid is obtained according to the single service integrated throughput of each service in the grid.

A physical meaning of the total service integrated throughput in the grid is a multi-service integrated throughput on a same time slice after a data transmission probability of each service is considered comprehensively.

d. UTT of a single user terminal=Total service integrated throughput*Number of concurrent services of a single user.

That is, the UTT of the user terminal is obtained according to the total service integrated throughput in the grid and the number of concurrent services of a single user of the user terminal.

A physical meaning of the UTT is a throughput required by a single user terminal that may perform multiple services concurrently on a same time slice, where the UTT may be obtained through calculation according to a throughput required for a single service multiplied by the number of concurrent services of a single user.

During calculation of the total service integrated throughput, in addition to the single service experience throughput benchmark and the network service model, an increase factor of a single service may be used. Increase factors of different services in the grid may be referred to as Increase-Factors. Different IncreaseFactors may cause different service traffic, thereby affecting a final UTT calculation result.

The following describes the foregoing calculation process using a specific example (for example, the service experience level is Excellent).

TABLE 3

| Service Type | Service Throughput Benchmark | | Service Traffic | Service Traffic Ratio | Service TranTime | Service TranTime Ratio | CoService Num |
| --- | --- | --- | --- | --- | --- | --- | --- |
| | Excellent | Good | | | | | |
| WEB | 512 | 256 | 13060645.34 | 21.47% | 25509.07293 | 61.73% | 1.36 |
| Streaming (240 P) | 300 | 256 | 133973.95 | 0.22% | 446.5798333 | 1.08% | |
| Streaming (360 P) | 900 | 768 | 9296.89 | 0.02% | 10.32987778 | 0.02% | |
| Streaming (480 P) | 2000 | 1650 | 64067.89 | 0.11% | 32.033945 | 0.08% | |
| Streaming (720 P) | 4096 | 2500 | 45009458.95 | 73.99% | 10988.63744 | 26.59% | |
| VoIP (Voice) | 128 | 64 | 8521.69 | 0.01% | 66.57570313 | 0.16% | |
| VoIP (Video) | 300 | 256 | 238670.4 | 0.39% | 795.568 | 1.93% | |

TABLE 3-continued

| Service Type | Service Throughput Benchmark | | Service Traffic | Service Traffic Ratio | Service TranTime | Service TranTime Ratio | CoService Num |
|---|---|---|---|---|---|---|---|
| | Excellent | Good | | | | | |
| SNS | 512 | 256 | 798406.2 | 1.31% | 1559.387109 | 3.77% | |
| Email | 600 | 400 | 8815.54 | 0.01% | 14.69256667 | 0.04% | |
| File Transfer | 1000 | 512 | 608795.07 | 1.00% | 608.79507 | 1.47% | |
| IM | 64 | 32 | 9051.57 | 0.01% | 141.4307813 | 0.34% | |
| Cloud | 800 | 400 | 819960.8 | 1.35% | 1024.951 | 2.48% | |
| Gaming | 512 | 256 | 62878.98 | 0.10% | 122.8105078 | 0.31% | |

For example, for the WEB service, a throughput corresponding to the WEB service is 512 kbps if the single service experience throughput benchmark is excellent, and a throughput corresponding to the WEB service is 256 kbps if the single service experience throughput benchmark is good. Service traffic corresponding to the WEB service is 1306045.34, that is, ServiceTraffic in Table 3 refers to service traffic of a single service, namely, single service traffic of service i. A weight (ServiceTrafficRatio) occupied by the WEB service traffic in all service traffic in the grid is 21.47%, the single target data transmission time of the WEB service is 25509.07293, and a single target data transmission weight of the WEB service is 61.73%.

For example, for a 720 P Streaming service, a throughput corresponding to the 720 P Streaming service is 4096 kbps if the single service experience throughput benchmark is excellent, and a throughput corresponding to the 720 P Streaming service is 2500 kbps if the single service experience throughput benchmark is good. Service traffic corresponding to the 720 P Streaming service is 45009458.95. A weight occupied by the 720 P Streaming service traffic in all service traffic in the grid is 73.99%, the single target data transmission time of the 720 P Streaming service is 10988.63755, and a single target data transmission weight of the 720 P Streaming service is 26.59%.

For another example, for the user terminal shown in Table 3, the number of concurrent services is 1.36.

As shown in Table 3, for each service, a weight occupied by the service traffic in all service traffic in the grid is considered. In this embodiment of the present disclosure, during calculation of the UTT, different manners may be selected according to an actual situation. That is, as shown in FIG. 2, before the UTT of a single user is obtained, a specific method for calculating the UTT needs to be determined. For example, for some user terminals, possibly only main services need to be guaranteed, and therefore, during calculation of the UTT, only the main services may be considered, for other user terminals, possibly services with heavy traffic need to be guaranteed, and therefore, during calculation of the UTT, only the services with heavy traffic may be considered, and so on.

Therefore, in this embodiment of the present disclosure, after parameters used for calculating the UTT such as the single target data transmission weight of each service, the single service experience throughput benchmark of each service, and the number of concurrent services of a single user are obtained, the UTT may be calculated selectively according to a network running status. Generally, a final method for obtaining the UTT mainly includes a high-priority service guarantee method, a maximum traffic guarantee method, and an integrated service guarantee method.

High-priority service guarantee method: A main service in the live network or a main service that an operator will develop is selected for guarantee, and N high-priority services may be selected according to a requirement.

Maximum traffic guarantee method: A service that requires maximum traffic in the network is mainly guaranteed, a certain ratio is selected for guarantee, and a service that contributes to top M % network traffic may be selected for guarantee according to a requirement.

Integrated service guarantee method: A distribution of all services in the entire network is considered comprehensively for calculating the UTT.

(1) High-priority service guarantee method (for example, only the web and streaming services are guaranteed).

It is guaranteed that the sum of real ServiceTranTime of the services occupies a ratio 89.51% of the entire network, and that a relative ratio of ServiceTranTime of several services is: WEB:Streaming(240 P):Streaming(360 P):Streaming(480 P):Streaming(720 P)=61.73%:1.08%:0.02%:0.08%:26.59%. When only the several services are guaranteed, their relative ratio needs to be converted to 100%, namely, WEB: Streaming(240 P): Streaming(360 P): Streaming(480 P): Streaming(720 P)=68.97%:1.21%:0.03%:0.09%:29.71%, and therefore, UTT=(512*68.97%+300*1.21%+900*0.03%+2000*0.09%+4096*29.71%)*1.36=2142.86 (kbps)

An extreme case is that only a Streaming(720 P) service with a highest bandwidth requirement is guaranteed, and therefore, UTT=4096 (kbps).

(2) Maximum traffic guarantee method (for example, only a service that requires traffic occupying 90% network traffic is guaranteed).

According to the analysis of the ServiceTrafficRatio, services that contribute to 90% network traffic are WEB and Streaming(720 P), and their traffic contributions are 21.47% and 73.99% respectively. The sum of ServiceTranTime of the two services is 88.32%. A relative radio of ServiceTranTime of the two services is WEB:Streaming(720 P)=61.73%:26.59%. When only the two services are guaranteed, their relative ratio needs to be converted to 100%, namely, WEB:Streaming(720 P)=69.89%:30.11%, and therefore, UTT=(512*69.89%+4096*30.11%)*1.36=2163.84 (kbps)

(3) Integrated service guarantee method: UTT= (512*61.73%+300*1.08%+900 *0.02%+2000*0.08%+4096*26.59%+128*0.16%+300*1.93%+512*3.77%+600*0.04%+1000*1.47%+64*0.34%+800*2.48%+512*0.31%)*1.36=2002.28 (kbps)

In this embodiment of the present disclosure, in addition to determining the UTT, the GTA of the grid in which the user terminal is located needs to be determined. The sequence of steps of determining the UTT and determining the GTA is not limited, or the steps may be performed simultaneously, which is not limited in this embodiment of the present disclosure.

Optionally, in this embodiment of the present disclosure, determining the GTA may include determining the GTA according to a network-scheduled throughput obtained in the grid by the user terminal.

Optionally, in this embodiment of the present disclosure, the GTA may be calculated according to resource consumption of the network, the number of users, and radio channel quality statistics. All the information may be obtained from logs of network elements, for example, call drop statistics, MRs, and performance principle tools (PCHRs).

Figure 3:
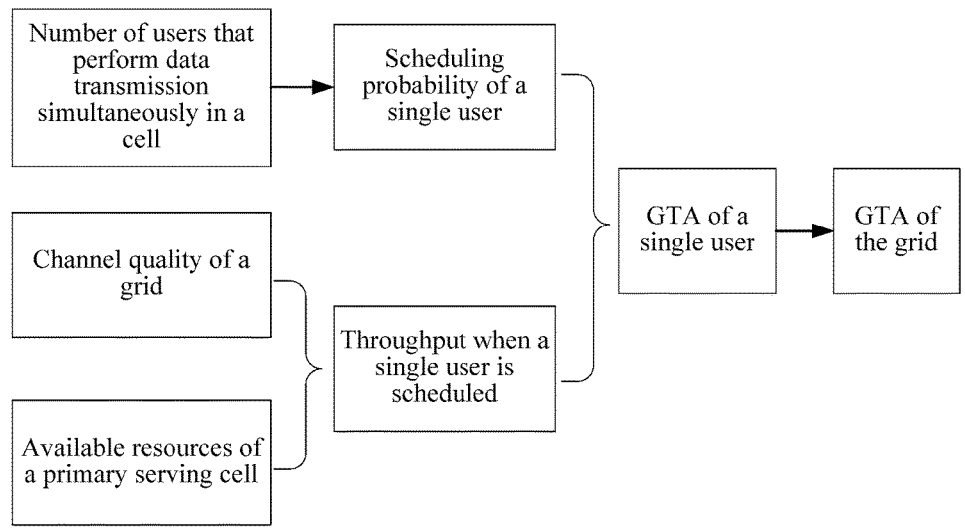
FIG. 3 is a flowchart of a method for calculating a GTA according to an embodiment of the present disclosure.

Referring to FIG. 3, FIG. 3 is a schematic flowchart of calculating the GTA.

A single user scheduling probability of each user terminal may be obtained according to the number of user terminals that perform data transmission simultaneously in a cell.

A throughput V when a single user is scheduled indicates a throughput that can be reached when a user terminal located in a certain grid is covered by a primary serving cell and when all available resources of the primary serving cell are provided to the user terminal for use. V is mainly related to grid channel quality (GridCQI) and available resources of the primary serving cell such as power resources and code resources in the grid. When the number of users that perform data transmission simultaneously is K, a probability that each user terminal is scheduled is 1/K. In a statistical period, in a cell, the GTA of the single user terminal is V*1/K. A GTA of a cell may be obtained according to GTAs in all users in the cell, and the GTA of the cell is indicated by a CellGTA.

In a wireless network, a same grid is generally covered by multiple cells. Therefore, during calculation of a GTA of a grid, CellGTAs of multiple cells need to be considered comprehensively. A common method is to obtain the GTA of the grid after weighted averaging is performed on the CellGTAs of the cells. A weight of each cell is a service duration ratio occupied by the corresponding cell in the grid. The service duration ratio may be measured by a periodic MR ratio, namely, CellMRratio, that is, $$GTA = \sum_{j=1}^{H} (CellGTA\_j * CellMRRatio\_j),$$

where the GTA is a GTA of a grid, H is the number of cells covering the grid, CellGTA_j indicates a GTA of a $j^{th}$ cell, and CellMRRatio_j indicates an MRratio of the $j^{th}$ cell. For a cell, a service duration ratio occupied by the cell in the grid refers to a ratio of duration of a service performed by the cell in the grid to total duration of services performed by all cells of the grid in the grid.

Step 102: Determine, according to at least the UTT and the GTA, whether a GAP area exists in the grid.

After the UTT and the GTA are determined, whether a GAP area exists in the grid may be determined according to at least the UTT and the GTA.

In this embodiment of the present disclosure, each grid corresponds to a UTT and a GTA. For a grid in which a GTA is lower than a UTT, it is considered that a GAP area exists, that is, a throughput capability of the grid cannot ensure that user service experience reaches a target service experience level, for example, Good or Excellent.

In this embodiment of the present disclosure, whether a GAP area exists in the grid is determined according to the UTT and the GTA, or may be determined according to the UTT, the GTA, and the URT and SRT of each grid together. That is, determining whether a GAP area exists in the grid may include determining a URT of the user terminal and an SRT of the user terminal that are in the grid, and determining whether a GAP area exists in the grid according to the UTT, the GTA, and the URT, and the SRT.

If whether a GAP area exists in the grid is determined according to the UTT, the GTA, and the URT and SRT of each grid together, the SRT and the URT need to be first determined.

In this embodiment of the present disclosure, the URT is a real transmission throughput of a single user terminal, does not distinguish what service the user terminal performs, but presents a real transmission throughput on a user level by statistics. The SRT is a real transmission throughput of a single service, and presents a real transmission throughput on a service level according to statistics of differences between different services.

In this embodiment of the present disclosure, after the network service model is acquired, the URT and SRT of each cell may be obtained. The URT and SRT of each grid may be further obtained by associating the network service model with geographic location information of MR positioning. Formulas for calculating the URT and the SRT are as follows URT=SUM (Service traffic of a single user)/SUM (Real transmission time of a single user), and SRT=SUM (Single service traffic of service i)/SUM(Single service real transmission time of service i).

That is, the URT is equivalent to a real transmission throughput of a single user terminal that is obtained by dividing service traffic of all user terminals by the real transmission time of all user terminals, and the URT is also equivalent to a real average transmission throughput of a single user terminal. The SRT is equivalent to service traffic of all services divided by the real transmission time of all services, and the SRT is also equivalent to a real average transmission throughput of a single service. The real transmission time of a single service may be indicated by ServiceRealTransTime.

The sequence of steps of determining the UTT, the GTA, the URT, and the SRT may be adjusted randomly.

Optionally, in this embodiment of the present disclosure, a possible manner of determining, according to the parameters UTT/URT(SRT)/GTA together, whether a GAP area exists in the grid includes using the several parameters as input parameters, performing simulation using simulation software, and determining, according to an obtained simulation result, whether a GAP area exists in the grid. For example, during simulation, the UTT, URT (SRT), and GTA are all processed according to a grid distribution manner. In the simulation result, shapes, sizes, and so on of areas corresponding to the UTT, URT (SRT), and GTA are approximately the same. Therefore, if a subarea exists, corresponding locations of the subarea in the three areas are the same, and the subarea is presented as a hole in all the three areas, which indicates that a GAP area exists in the subarea.

Because parameters of three aspects need to be used in this method, and the obtained simulation result may be visual, this method may also be referred to as a three-in-one visual presentation method.

The three refer to 1. target throughput—UTT, 2. throughput ability—GTA, 3. real throughput—URT and SRT, and the one refers to a same geographic location, namely, a same grid.

Through three-in-one visible presentation of the three throughputs, in addition to visual presentation of the URT and SRT of the user terminal in the live network, an area in which a GTA does not meet a UTT in the live network can be visually found such that a corresponding planning optimization action can be taken in a timely manner.

Figure 4:
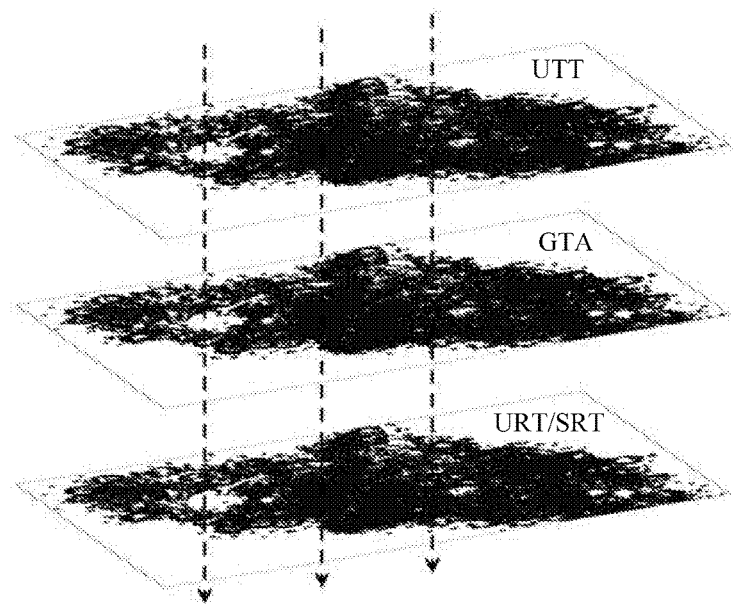
FIG. 4 is a schematic diagram of a simulation result according to an embodiment of the present disclosure.

For example, as shown in FIG. 4, FIG. 4 is a schematic diagram of a simulation result using the three-in-one visible presentation method. It can be obviously seen from FIG. 4 that all subareas corresponding to parts that a dashed line passes through are presented as holes in the three areas. Therefore, it may be determined that a GAP area exists in the parts that the dashed line passes through.

Further, in this embodiment of the present disclosure, corresponding processing needs to be performed on the grid according to a type of the grid when a GAP area exists.

In this embodiment of the present disclosure, the method may further include determining a type corresponding to the grid, and determining, according to the type corresponding to the grid, a method for enhancing the GTA of the grid, to eliminate the GAP area when a GAP area exists in the grid.

Optionally, in this embodiment of the present disclosure, determining whether a GAP area exists in the grid and determining a type corresponding to the grid are two independent steps. The two steps may be executed in any sequence, which is not limited in this embodiment of the present disclosure. Optionally, during specific execution, determining whether a GAP area exists in the grid may be selected first, and the type corresponding to the grid is determined if a GAP area exists in the grid. In this way, the grid may be re-planned, if no GAP area exists in the grid, which can minimize operation steps and reduce an operation time.

In this embodiment of the present disclosure, there are mainly two types of grids in which a GAP area exists, a coverage-restricted type and a capacity-restricted type.

Optionally, in an embodiment of the present disclosure, determining a type corresponding to the grid may include determining that the grid is of the coverage-restricted type. Therefore, an indication signal is sent to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

In this embodiment of the present disclosure, the network management device may be an upper-level network management device, or may be a provided human-computer interaction interface. The indication signal is sent to the human-computer interaction interface to notify an operator that a new base station needs to be added to the grid to enhance the GTA of the grid such that a corresponding operation can be performed on the grid. Alternatively, the network management device may also be another device, as long as the network management device can receive the indication signal. What device the network management device is not limited in the present disclosure.

Optionally, in another embodiment of the present disclosure, the determining a type corresponding to the grid may include determining that the grid is of the capacity-restricted type. Therefore, enhancing the GTA of the grid in a carrier expansion manner is determined when a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

There are corresponding different improvement methods if a GAP area exists in the grid, for the grids of different types.

1. Coverage-Restricted Type.

Coverage-restricted indicates that bad GridCQI caused by excessively low RSCP of the grid makes it impossible to select a big transport block for data transmission during scheduling and further causes a bad GTA of the grid.

Optionally, a method for determining whether the grid is of the coverage-restricted type includes determining whether RSCP of the grid is lower than a first preset RSCP threshold, and determining that the type corresponding to the grid is the coverage-restricted type if the RSCP of the grid is lower than the first preset RSCP threshold.

For a coverage-restricted scenario, a planning method of establishing a new base station may be preferentially used to enhance network coverage and further enhance the GTA.

Figure 5:
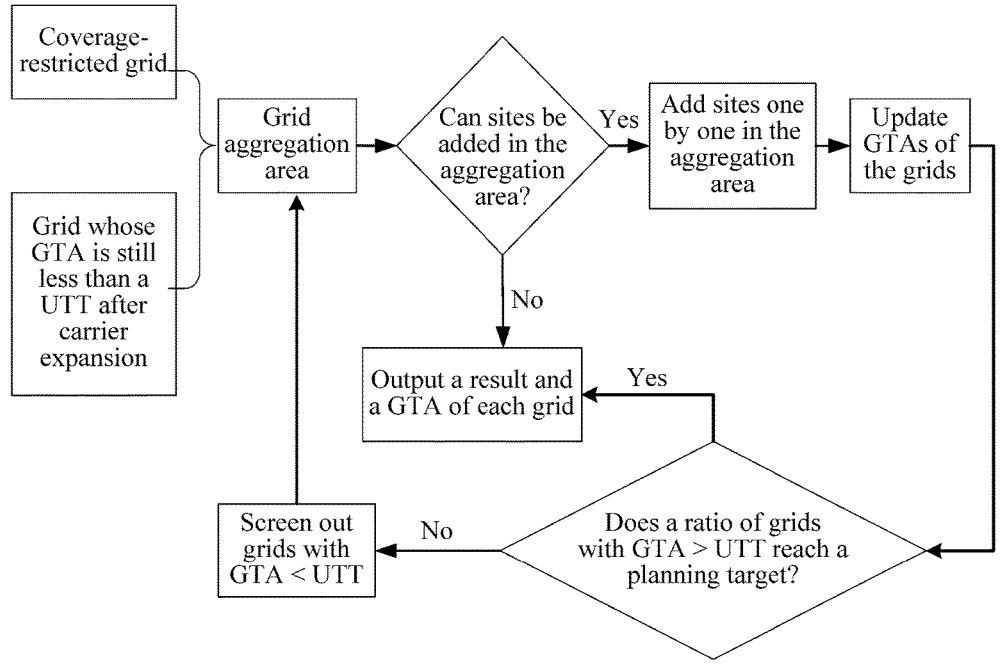
FIG. 5 is a flowchart of a method for establishing a new site according to an embodiment of the present disclosure.

Referring to FIG. 5, an embodiment of the present disclosure provides a method for establishing a new base station. In this embodiment of the present disclosure, establishing a new site refers to establishing a new base station.

First, it is necessary to determine a grid whose GTA needs to be enhanced using the method for establishing a new site. In this embodiment of the present disclosure, the grid whose GTA needs to be enhanced using the method for establishing a new site is a coverage-restricted grid, or is a grid whose GTA after carrier expansion is still lower than the UTT. The coverage-restricted grid and the grid whose GTA after carrier expansion is still lower than the UTT form a grid aggregation area.

(1) Problem About Whether Sites can be Added in an Aggregation Area.

There is a condition for determining whether a site can be added in an aggregation area, and a common determining condition is a distance between a location of a new site and a smallest site of an existing base station in the live network needs to be greater than a threshold, and the number of grids or the number of users or service traffic that the new site resolves needs to be large enough.

If the foregoing determining condition is met, it is determined that a site can be added in the aggregation area, and in the aggregation area, sites can be added one by one for grids in which sites need to be added.

If the foregoing determining condition is not met, it is determined that a site cannot be added in the aggregation area, and a result and a GTA of each grid may be output. In this case, the result is a result without site addition, and the GTA of each grid is also an original GTA of each grid.

(2) GTAs of Grids Need to be Updated After Sites are Added.

If sites are added one by one in the aggregation area, after the sites are added, the number of users that may be absorbed by each new site and a quality status of an air interface channel may be obtained through simulation, that is, the number of users that perform data transmission simultaneously in a cell, GridCQI, and available resources of the grid after the new sites are added can be obtained. Then the GTA of the grid may be calculated. After the new GTA of the grid is calculated, because the GTA of the grid is changed, the GTA of the grid needs to be updated. Available resources of the grid generally refer to available power resources of the grid.

(3) After the GTAs are Updated, Whether a Ratio With GTA>UTT Reaches a Planning Target May be Determined, Where the Planning Target May be Referred to as PlanningTargetRatio.

Planning costs vary according to different planning targets. Common planning targets include ensuring a certain ratio of grids with GTA>UTT, or ensuring a certain ratio of user terminals with GTA>UTT, or ensuring a ratio of service traffic with GTA>UTT.

Through the flexible setting of the PlanningTargetRatio and simulation of the GTA, the number of added sites can be controlled, and a return on investment of network construction can be guaranteed as much as possible.

If a ratio with GTA>UTT reaches the planning target, a result and a GTA of each grid may be output. In this case, the output result is a result after sites are added, and the GTA of each grid is also an updated GTA after the sites are added.

If a ratio with GTA>UTT does not reach the planning target, grids with GTA<UTT may be screened out, and the grids are reincorporated into the grid aggregation area, and whether sites can be added in the aggregation area may be re-determined.

2. Capacity-Restricted Type.

Capacity-restricted indicates that a user terminal throughput is excessively low because there are few available resources in the primary serving cell, or that a probability that each user terminal is scheduled is low because the number of user terminals is excessively large, causing a bad GTA of the grid.

Optionally, in this embodiment of the present disclosure, a method for determining whether the grid is of the capacity-restricted type includes determining whether RSCP of the grid is higher than a second preset RSCP threshold, and determining whether EcIo of the grid is higher than a preset EcIo threshold, and determining that the type corresponding to the grid is the capacity-restricted type when the RSCP of the grid is higher than the second preset RSCP threshold, and the EcIo of the grid is higher than the preset EcIo threshold.

In this embodiment of the present disclosure, the first preset RSCP threshold and the second RSCP threshold may be equal or not equal.

For a capacity-restricted scenario, a planning method of carrier expansion may be preferentially used to share traffic, enhance a user throughput of the primary serving cell, and at the same time reduce the number of users, thereby enhancing the GTA.

Optionally, because available resources of each operator are limited, after the carrier expansion method is selected, if the GTA of the grid after carrier expansion of a sector reaches a maximum number of carriers is still lower than the UTT, capacity sharing may be planned for the grids using the method for establishing a new base station, thereby enhancing the GTA.

The following describes the carrier expansion method.

Carrier expansion in the grid is essentially carrier expansion in a cell covering the grid. A candidate cell in which carrier expansion is performed needs to meet the following two conditions.

a. Current carriers in a sector in which the cell is located are not fully configured, that is, there are redundant available frequencies, and CurrentCarriers<AllowedMaxCarriers. CurrentCarriers indicates the number of current carriers in the cell, and AllowedMaxCarriers indicates the allowed maximum number of carriers of the cell.

Optionally, enhancing the GTA of the grid in a carrier expansion manner may further refer to increasing the number of carriers for the primary serving cell of the grid.

Further, enhancing the GTA of the grid in a carrier expansion manner may include determining whether the number of current carriers of the primary serving cell of the grid is less than the allowed maximum number of carriers, and adding carriers for the primary serving cell of the grid when the number of current carriers of the primary serving cell of the grid is less than the allowed maximum number of carriers. There are multiple cells covering a grid, where one cell plays a dominant control role in the grid, and this cell is referred to as a primary serving cell of the grid.

b. A grid absolutely controlled by the cell includes a grid in which a GAP area exists. Absolute control is determined by a condition MRratio>MRratioThreshold, where MRratio indicates a ratio of duration occupied when the cell performs a service in the grid to total duration occupied when all cells of the grid perform services in the grid. MRratioThreshold may be configured. The condition is mainly for excluding a grid located in a handover area. For the grid located in the handover area, a user terminal may be handed over frequently when performing a service. A throughput gain actually obtained by a terminal user is not obvious if carriers are added to only a certain cell. The parameter may be used to control the number of expanded carriers. A cell may cover multiple grids, and the cell may play a control role in the multiple grids. However, the cell may be only a primary serving cell in one of the grids, and therefore, the cell plays an absolute control role in the grid.

In this embodiment of the present disclosure, when carrier expansion is performed, generally, carrier expansion is first performed on the primary serving cell of the grid. If the primary serving cell of the grid does not meet the foregoing two conditions, other serving cells of the grid are selected for carrier expansion.

After carrier expansion is performed, the number of carriers increases. In a case in which the number of user terminals is not changed, the user terminals may be allocated to more carriers, the number of user terminals that perform data transmission simultaneously in each carrier decreases, there are more available resources in each carrier, a probability that each user terminal is scheduled is higher, and therefore the GTA of the grid is higher.

After carrier expansion is performed, because the GTA of the grid is changed, the GTA of the grid needs to be re-calculated and updated.

After carrier expansion is performed, whether the added carriers are effective may be determined.

For determining whether the added carriers are effective, a method includes determining whether the following two conditions are met simultaneously.

1. At least one of the following (1) and (2) is met.

(1) at least GTAs of GridThreshold grids in which GAPs exist reach the UTT, where GridThreshold is the preset number, and (2) a GTA enhancement value of at least one grid in which a GAP area exists is greater than ThroughputThreshold, where ThroughputThreshold is a preset enhancement value.

2. Compared with the number of grids meeting the condition 1 last time, the number of grids meeting the condition 1 after carriers are added is increased this time.

If (1) in the condition 1 is met, optionally, after increasing the number of carriers in the primary serving cell of the grid, the method may further include determining whether the number of grids meeting a preset condition and in which GAP areas exist reaches the preset number, and determining whether the number of grids meeting the preset condition is increased after the carriers are added, where the preset condition is that a GTA of a grid in which a GAP area exists reaches a UTT, and determining that the added carriers are effective when the number of grids meeting the preset condition and in which GAP areas exist reaches the preset number, and that the number of grids meeting the preset condition is increased.

The carrier expansion method is theoretically described in detail above. The following gives explanations using a specific example for ease of understanding.

GridThreshold is set to 1. After carriers are added, the number of grids meeting "a GTA of a grid in which a GAP area exists reaches a UTT" is OverGridThresholdNum. After carrier expansion, the number of grids meeting "a GTA enhancement value of a grid in which a GAP exists is greater than ThroughputThreshold" is OverThroughputThresholdNum.

TABLE 4

| Number of added carriers | OverGridThresholdNum | OverThroughputThresholdNum |
| --- | --- | --- |
| 1 | 1 | 1 |
| 2 | 2 | 2 |
| 3 | 3 | 2 |

In the embodiment shown in Table 4, a minimum value of the number of expanded carriers corresponding to a maximum value of OverGridThresholdNum is 3, and a minimum value of the number of expanded carriers corresponding to a maximum value of OverThroughputThresholdNum is 2. Then max(3, 2)=3, and therefore the final number of expanded carriers is 3.

TABLE 5

| Number of added carriers | OverGridThresholdNum | OverThroughputThresholdNum |
| --- | --- | --- |
| 1 | 1 | 1 |
| 2 | 3 | 2 |
| 3 | 3 | 2 |

In the embodiment shown in Table 5, a minimum value of the number of expanded carriers corresponding to a maximum value of OverGridThresholdNum is 2, and a minimum value of the number of expanded carriers corresponding to a maximum value of OverThroughputThresholdNum is 2. Then max(2, 2)=2, and therefore the final number of expanded carriers is 2.

TABLE 6

| Number of added carriers | OverGridThresholdNum | OverThroughputThresholdNum |
| --- | --- | --- |
| 1 | 3 | 1 |
| 2 | 3 | 2 |
| 3 | 3 | 3 |

In the embodiment shown in Table 6, a minimum value of the number of expanded carriers corresponding to a maximum value of OverGridThresholdNum is 1, and a minimum value of the number of expanded carriers corresponding to a maximum value of OverThroughputThresholdNum is 3. Then max(1, 3)=3, and therefore the final number of expanded carriers is 3.

Through the flexible setting of GridThreshold and ThroughputThreshold, the final number of expanded carriers can be controlled.

In this embodiment of the present disclosure, for grids of different types, different processing manners may be used to enhance the GTAs of the grids such that the processing method is more conformable to actual situations of the grids, and can enhance the GTAs of the grids more effectively and more pertinently.

In the technical solution provided by this embodiment of the present disclosure, a target network is planned comprehensively according to a user target throughput of a user terminal and a grid throughput ability of a grid, user experience is quantized into a target bandwidth throughput, and network planning is conducted depending on bandwidth requirements of different services in the network. Conducting network planning depending on real service features of a network can achieve a more appropriate network planning result and improve user experience while fully considering experience of a terminal user.

Figure 6A:
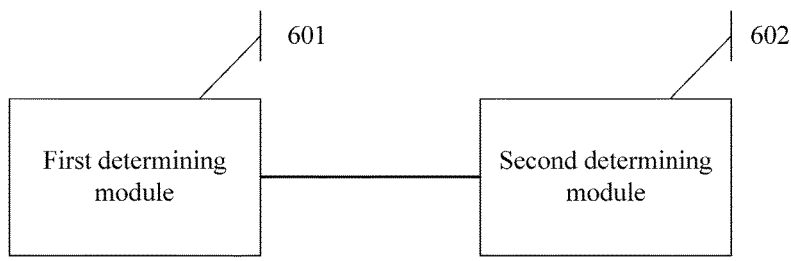
FIG. 6A is a block diagram of a main structure of an information processing apparatus according to an embodiment of the present disclosure.

Referring to FIG. 6A, an embodiment of the present disclosure provides an information processing apparatus. The information processing apparatus may include a first determining module 601 and a second determining module 602.

The first determining module 601 may be configured to determine a UTT for a user terminal, and determine a GTA of a grid in which the user terminal is located.

The second determining module 602 may be configured to determine, according to at least the UTT and the GTA, whether a GAP area exists in the grid.

Optionally, in this embodiment of the present disclosure, that the first determining module 601 may be configured to determine a UTT for a user terminal includes determining the UTT for the user terminal according to a service experience level and a network service model.

Optionally, in this embodiment of the present disclosure, that the first determining module 601 may be configured to determine the UTT for the user terminal according to a service experience level and a network service model includes separately determining single service experience throughputs of N services according to the service experience level and the network service model, where N is the total number of services corresponding to the user terminal, and determining the UTT according to the single service experience throughputs of the N services and the network service model.

Optionally, in this embodiment of the present disclosure, the network service model includes at least the number of concurrent services of a single user, and the first determining module 601 may be further configured to determine the UTT according to the single service experience throughputs of the N services and the network service model and includes setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining single service integrated throughputs of the N services in total, and obtaining a total service integrated throughput in the grid according to the single service integrated throughputs of the N services, and obtaining the UTT of the user terminal according to the total service integrated throughput in the grid and the number of concurrent services of the user terminal.

Optionally, in this embodiment of the present disclosure, the first determining module 601 may be configured to determine a GTA of a grid in which the user terminal is located includes determining the GTA according to a network-scheduled throughput obtained in the grid by the user terminal.

Optionally, in this embodiment of the present disclosure, the second determining module 602 may be further configured to determine a URT of the user terminal and a single SRT of the user terminal that are in the grid, and determine, according to the UTT, the GTA, the URT, and the SRT, whether a GAP area exists in the grid.

Figure 6B:
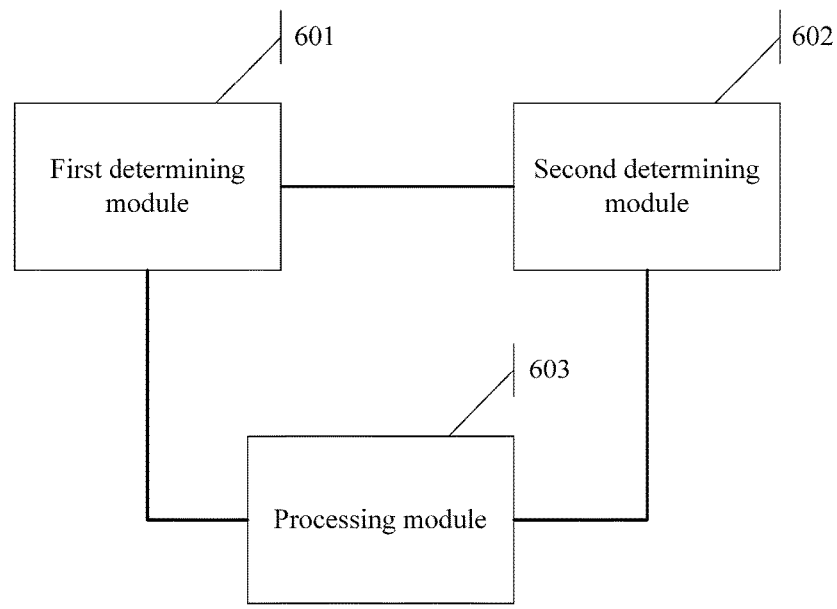
FIG. 6B is a block diagram of a detailed structure of an information processing apparatus according to an embodiment of the present disclosure.

Optionally, referring to FIG. 6B, in this embodiment of the present disclosure, the apparatus may further include a processing module 603.

The processing module 603 is configured to determine a type corresponding to the grid, and determine, according to the type corresponding to the grid, a method for enhancing the GTA of the grid, to eliminate the GAP area when a GAP area exists in the grid.

Optionally, in this embodiment of the present disclosure, the processing module 603 is configured to determine that a type corresponding to the grid is of a coverage-restricted type, and the processing module may be further configured to send an indication signal to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

Optionally, in this embodiment of the present disclosure, the processing module 603 may be further configured to determine that the grid is of a coverage-restricted type includes determining whether RSCP of the grid is lower than a first preset RSCP threshold, and determining that the type corresponding to the grid is the coverage-restricted type if the RSCP of the grid is lower than the first preset RSCP threshold.

Optionally, in this embodiment of the present disclosure, the processing module 603 may be configured to determine a type corresponding to the grid is of a capacity-restricted type, and the processing module 603 may be further configured to determine to enhance the GTA of the grid in a carrier expansion manner when a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

Optionally, in this embodiment of the present disclosure, the processing module 603 is further configured to determine that the grid is of a capacity-restricted type includes determining whether RSCP of the grid is higher than a second preset RSCP threshold, and determining whether a EcIo of the grid is higher than a preset EcIo threshold, and determining that the type corresponding to the grid is the capacity-restricted type if the RSCP of the grid is higher than the preset RSCP threshold, and the EcIo of the grid is higher than the preset EcIo threshold.

Optionally, in this embodiment of the present disclosure, the processing module 603 may be further configured to determine to enhance the GTA of the grid in a carrier expansion manner includes increasing the number of carriers in the primary serving cell of the grid.

Optionally, in this embodiment of the present disclosure, the processing module 603 may be further configured to determine whether the number of grids meeting a preset condition and in which GAP areas exist reaches a preset number, and determine whether the number of grids meeting the preset condition is increased after carriers are added, where the preset condition is that a GTA of a grid in which a GAP area exists reaches a UTT, and determine that the added carriers are effective when the number of grids meeting the preset condition and in which GAP areas exist reaches the preset number, and that the number of grids meeting the preset condition is increased.

Figure 7:
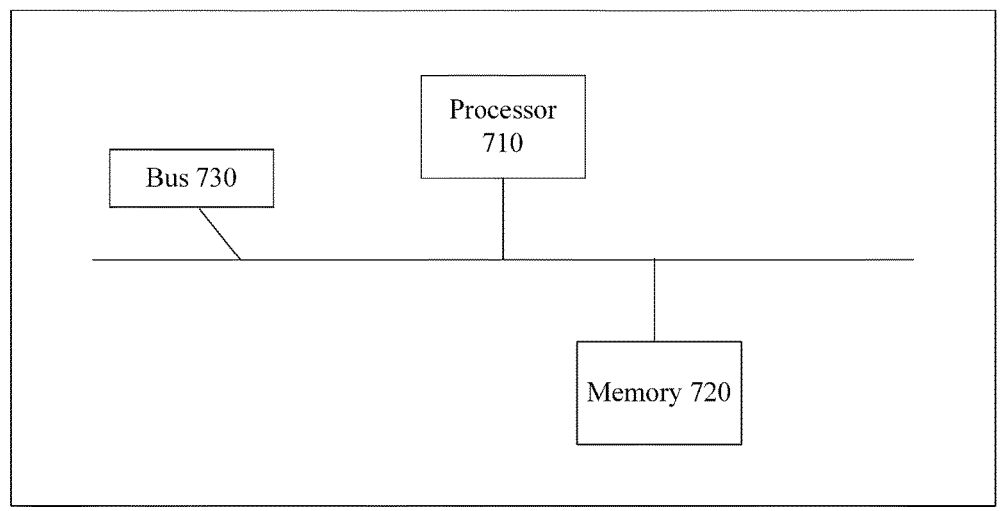
FIG. 7 is a schematic diagram of a structure of an information processing apparatus according to an embodiment of the present disclosure.

Referring to FIG. 7, an embodiment of the present disclosure provides an information processing apparatus. The apparatus includes a bus 730, and a processor 710 and a memory 720 that are connected to the bus 730. The memory 720 is configured to store an instruction. The processor 710 is configured to execute the instruction, determine a UTT for a user terminal, and determine a GTA of a grid in which the user terminal is located, and determine, according to at least the UTT and the GTA, whether a GAP area exists in the grid.

Optionally, in this embodiment of the present disclosure, the processor 710 is configured to determine a UTT for a user terminal by executing the instruction, and determining the UTT for the user terminal according to a service experience level and a network service model.

Optionally, in this embodiment of the present disclosure, the processor 710 is further configured to execute the instruction, and determine the UTT for the user terminal according to a service experience level and a network service model includes executing the instruction, and separately determining single service experience throughputs of N services according to the service experience level and the network service model, where N is the total number of services corresponding to the user terminal, and determining the UTT according to the single service experience throughputs of the N services and the network service model.

Optionally, in this embodiment of the present disclosure, the network service model includes at least the number of concurrent services of a single user, and that the processor 710 is further configured to execute the instruction, and determine the UTT according to the single service experience throughputs of the N services and the network service model which includes executing the instruction, setting i to an integer from 1 to N, and separately performing the steps of calculating a single target data transmission time of an $i^{th}$ service according to a data amount of the $i^{th}$ service and a single service experience throughput of the $i^{th}$ service, calculating a single target data transmission weight of the $i^{th}$ service according to the single target data transmission time of the $i^{th}$ service and a total target data transmission time of all services, and obtaining single target data transmission weights of the N services in total, continuing to set i to an integer from 1 to N, and separately performing the steps of calculating a single service integrated throughput of the $i^{th}$ service according to the single target data transmission weight of the $i^{th}$ service and the single service experience throughput of the $i^{th}$ service, and obtaining single service integrated throughputs of the N services in total, and obtaining a total service integrated throughput in the grid according to the single service integrated throughputs of the N services, and obtaining the UTT of the user terminal according to the total service integrated throughput in the grid and the number of concurrent services of the user terminal.

Optionally, in this embodiment of the present disclosure, the processor 710 is configured to determine a GTA of a grid in which the user terminal is located which includes executing the instruction, and determining the GTA according to a network-scheduled throughput obtained in the grid by the user terminal.

Optionally, in this embodiment of the present disclosure, the processor 710 is configured to determine, according to at least the UTT and the GTA, whether a GAP area exists in the grid which includes executing the instruction, determining a URT of the user terminal and a single SRT of the user terminal that are in the grid, and determining, according to the UTT, the GTA, the URT, and the SRT, whether a GAP area exists in the grid.

Optionally, in this embodiment of the present disclosure, the processor 710 is further configured to execute the instruction, and determine a type corresponding to the grid, and determine, according to the type corresponding to the grid, a method for enhancing the GTA of the grid, to eliminate the GAP area when a GAP area exists in the grid.

Optionally, in this embodiment of the present disclosure, that the processor 710 is configured to execute the instruction, and determine a type corresponding to the grid which includes executing the instruction, and determining that the grid is of a coverage-restricted type, and the processor 710 may be further configured to execute the instruction, and send an indication signal to a network management device when a GAP area exists in the grid and that the grid is of the coverage-restricted type, where the indication signal is used to indicate that a new base station needs to be added to the grid to enhance the GTA of the grid, where the coverage-restricted type indicates that channel quality of the grid is lower than a preset channel quality threshold.

Optionally, in this embodiment of the present disclosure, the processor 710 is further configured to execute the instruction, and determine that the grid is of a coverage-restricted type which includes executing the instruction, and determining whether RSCP of the grid is lower than a first preset RSCP threshold, and determining that the type corresponding to the grid is the coverage-restricted type if the RSCP of the grid is lower than the first preset RSCP threshold.

Optionally, in this embodiment of the present disclosure, the processor 710 is configured to execute the instruction, and determine a type corresponding to the grid which includes executing the instruction, and determining that the grid is of a capacity-restricted type, and the processor 710 is further configured to execute the instruction, and determine to enhance the GTA of the grid in a carrier expansion manner when a GAP area exists in the grid, and that the grid is of the capacity-restricted type, where the capacity-restricted type indicates that available resources in a primary serving cell of the grid are insufficient, or that the number of user terminals in the grid exceeds a preset number threshold.

Optionally, in this embodiment of the present disclosure, the processor 710 is further configured to execute the instruction, and determine that the grid is of a capacity-restricted type which includes executing the instruction, determining whether RSCP of the grid is higher than a second preset RSCP threshold, and determining whether a EcIo of the grid is higher than a preset EcIo threshold, and determining that the type corresponding to the grid is the capacity-restricted type if the RSCP of the grid is higher than the preset RSCP threshold, and the EcIo of the grid is higher than the preset EcIo threshold.

Optionally, in this embodiment of the present disclosure, the processor 710 is further configured to determine to enhance the GTA of the grid in a carrier expansion manner includes increasing the number of carriers in the primary serving cell of the grid.

Optionally, in this embodiment of the present disclosure, the processor 710 is further configured to execute the instruction, determine whether the number of grids meeting a preset condition and in which GAP areas exist reaches a preset number, and determine whether the number of grids meeting the preset condition is increased after carriers are added, where the preset condition is that a GTA of a grid in which a GAP area exists reaches a UTT, and determine that the added carriers are effective when the number of grids meeting the preset condition and in which GAP areas exist reaches the preset number, and that the number of grids meeting the preset condition is increased.

In this embodiment of the present disclosure, the apparatuses in FIG. 6 and FIG. 7 may be a same apparatus. The apparatus corresponds to the foregoing method. Each functional module included in the apparatus can execute each step in the method, which is not further described herein.

In this embodiment of the present disclosure, the apparatus may be further integrated on a base station side.

In this embodiment of the present disclosure, the base station (for example, an access point) may be a device communicating with a wireless terminal via one or more sectors on an air interface in an access network. The base station may be configured to perform mutual conversion between a received over-the-air frame and an IP packet and serve as a router between the wireless terminal and other parts of the access network, where the other parts of the access network may include an IP network. The base station may further coordinate attribute management of the air interface. For example, the base station may be a BTS in GSM or CDMA, or may be a NodeB in WCDMA, or may be an evolved NodeB in LTE, such as a NodeB, or an eNB, or an e-NodeB, or an evolutional Node B, which is not limited in the present application.

The information processing method in this embodiment of the present disclosure may include determining a UTT for a user terminal, and determining a GTA of a grid in which the user terminal is located, determining, according to at least the UTT and the GTA, whether a GAP area exists in the grid, and performing corresponding processing on the GAP area according to a type of the existing GAP area when a GAP area exists in the grid.

In the technical solution provided by this embodiment of the present disclosure, a target network is planned comprehensively according to a user target throughput of a user terminal and a grid throughput ability of a grid, user experience is quantized into a target bandwidth throughput, and network planning is conducted depending on bandwidth requirements of different services in the network. Conducting network planning depending on real service features of a network can achieve a more appropriate network planning result and improve user experience while fully considering experience of a terminal user.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely used to describe in detail the technical solutions of the present application. The descriptions of the foregoing embodiments are merely intended to help understand the method and core idea of the present disclosure, and shall not be construed as a limitation to the present disclosure. Any variation or replacement readily figured out by a person skilled in the art within the technical scope disclosed in the present disclosure shall fall within the protection scope of the present disclosure.

What is claimed is:

1. An information processing apparatus, comprising:
a memory; and
a processor coupled to the memory and configured to:
separately determine single service experience throughputs of N services according to a service experience level and a network service model, wherein the network service model comprises at least a number of concurrent services of a single user, wherein N is a total number of services corresponding to a user terminal;
set i to an integer from 1 to N, and separately perform the following operations:
calculate a single target data transmission time of an $i^{th}$ service according to a data amount of the $i^{th}$ service and a single service experience throughput of the $i^{th}$ service;
calculate a single target data transmission weight of the $i^{th}$ service according to the single target data transmission time of the $i^{th}$ service and a total target data transmission time of all services; and
obtain single target data transmission weights of the N services in total;
continue to set i to the integer from 1 to N, and separately perform the following operations:
calculate a single service integrated throughput of the $i^{th}$ service according to the single target data transmission weight of the $i^{th}$ service and the single service experience throughput of the $i^{th}$ service; and
obtain a total service integrated throughput in a grid according to single service integrated throughputs of the N services;
obtain a user target throughput (UTT) for the user terminal according to the total service integrated throughput in the grid and a number of concurrent services of the user terminal;
determine a grid throughput ability (GTA) of the grid in which the user terminal is located; and
determine, according to at least the UTT and the GTA, whether a gap (GAP) area exists in the grid.

2. The apparatus according to claim 1, wherein the processor is further configured to:
determine a type corresponding to the grid; and
determine, according to the type corresponding to the grid, a method for enhancing the GTA of the grid, to reduce the GAP area when the GAP area exists in the grid.

3. The apparatus according to claim 2, wherein that the processor is further configured to:
determine that the grid is of a coverage-restricted type; and
send an indication signal to a network management device when the GAP area exists in the grid and that the grid is of the coverage-restricted type, wherein the indication signal is used to indicate that a new base station needs to be added to the grid to enhance the GTA of the grid, and wherein the coverage-restricted type indicates that channel quality of the grid is lower than a preset channel quality threshold.

4. The apparatus according to claim 3, wherein that the processor is further configured to:
determine whether received signal code power (RSCP) of the grid is lower than a first preset RSCP threshold; and
determine that the type corresponding to the grid is the coverage-restricted type when the RSCP of the grid is lower than the first preset RSCP threshold.

5. The apparatus according to claim 2, wherein the processor is further configured to:
determine that the grid is of a capacity-restricted type; and
determine to enhance the GTA of the grid in a carrier expansion manner when the GAP area exists in the grid, and that the grid is of the capacity-restricted type, wherein the capacity-restricted type indicates that available resources in a primary serving cell of the grid are insufficient, or that a number of user terminals in the grid exceeds a preset number threshold.

6. The apparatus according to claim 5, wherein the processor is further configured to:
determine whether received signal code power (RSCP) of the grid is higher than a second preset RSCP threshold;
determine whether a current received pilot signal level (EcIo) of the grid is higher than a preset EcIo threshold; and
determine that the type corresponding to the grid is the capacity-restricted type when the RSCP of the grid is higher than the second preset RSCP threshold, and the EcIo of the grid is higher than the preset EcIo threshold.

7. The apparatus according to claim 6, wherein the processor is further configured to increase a number of carriers in the primary serving cell of the grid when determining to enhance the GTA of the grid in the carrier expansion manner.

8. The apparatus according to claim 7, wherein the processor is further configured to:
determine whether a number of grids meeting a preset condition and in which GAP areas exist reaches a preset number;
determine whether the number of grids meeting the preset condition is increased after carriers are added, wherein the preset condition is that a GTA of a grid in which a GAP area exists reaches a UTT; and
determine that the added carriers are effective when the number of grids meeting the preset condition and in which the GAP areas exist reaches the preset number, and that the number of grids meeting the preset condition is increased.

9. An information processing method, comprising:
separately determining single service experience throughputs of N services according to a service experience level and a network service model, wherein the network service model comprises at least a number of concurrent services of a single user, wherein N is a total number of services corresponding to a user terminal;
setting i to an integer from 1 to N, and separately perform the following operations:
calculating a single target data transmission time of an $i^{th}$ service according to a data amount of the $i^{th}$ service and a single service experience throughput of the $i^{th}$ service;
calculating a single target data transmission weight of the $i^{th}$ service according to the single target data transmission time of the $i^{th}$ service and a total target data transmission time of all services; and
obtaining single target data transmission weights of the N services in total;
continuing to set i to the integer from 1 to N, and separately perform the following operations:
calculating a single service integrated throughput of the $i^{th}$ service according to the single target data transmission weight of the $i^{th}$ service and the single service experience throughput of the $i^{th}$ service; and
obtaining a total service integrated throughput in a grid according to single service integrated throughputs of the N services;
obtaining a user target throughput (UTT) for the user terminal according to the total service integrated throughput in the grid and a number of concurrent services of the user terminal;
determining a grid throughput ability (GTA) of the grid in which the user terminal is located; and
determining, according to at least the UTT and the GTA, whether a gap (GAP) area exists in the grid.

10. The method according to claim 9, further comprising:
determining a type corresponding to the grid; and
determining, according to the type corresponding to the grid, a method for enhancing the GTA of the grid, to reduce the GAP area when the GAP area exists in the grid.

11. The method according to claim 10, wherein determining the type corresponding to the grid comprises:
determining that the grid is of a coverage-restricted type; and
sending an indication signal to a network management device when the GAP area exists in the grid and that the grid is of the coverage-restricted type, wherein the indication signal is used to indicate that a new base station needs to be added to the grid to enhance the GTA of the grid, wherein the coverage-restricted type indicates that channel quality of the grid is lower than a preset channel quality threshold.

12. The method according to claim 11, wherein determining that the grid is of the coverage-restricted type comprises:
determining whether received signal code power (RSCP) of the grid is lower than a first preset RSCP threshold; and
determining that the type corresponding to the grid is the coverage-restricted type when the RSCP of the grid is lower than the first preset RSCP threshold.

13. The method according to claim 10, wherein determining the type corresponding to the grid comprises:
determining that the grid is of a capacity-restricted type; and
determining to enhance the GTA of the grid in a carrier expansion manner when the GAP area exists in the grid, and that the grid is of the capacity-restricted type, wherein the capacity-restricted type indicates that available resources in a primary serving cell of the grid are insufficient, or that a number of user terminals in the grid exceeds a preset number threshold.

14. The method according to claim 13, wherein determining that the grid is of the capacity-restricted type comprises:
determining whether received signal code power (RSCP) of the grid is higher than a second preset RSCP threshold;
determining whether a current received pilot signal level (EcIo) of the grid is higher than a preset EcIo threshold; and
determining that the type corresponding to the grid is the capacity-restricted type when the RSCP of the grid is higher than the second preset RSCP threshold, and the EcIo of the grid is higher than the preset EcIo threshold.

* * * * *